Patented June 28, 1932

1,864,679

UNITED STATES PATENT OFFICE

KARL STREITWOLF, OF FRANKFORT-ON-THE-MAIN, ALFRED FEHRLE, OF BAD SODEN-ON-THE-TAUNUS, AND WALTER HERRMANN AND PAUL FRITZSCHE, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

BISMUTH-DITHIOGLYCOLIC ACID AND THE SALTS THEREOF AND A PROCESS OF PREPARING THEM

No Drawing. Application filed October 30, 1930, Serial No. 492,352, and in Germany June 5, 1930.

The present invention relates to bismuth-dithioglycolic acid and the salts thereof and to a process of preparing them.

It is known that the bismuth-trithioglycolic acid is formed on causing thioglycolic acid or a salt thereof to act upon a bismuth salt in the absence of a free acid (cf. Claesson, "Annalen der Chemie," volume 187, page 121; Rosenheim and Davidsohn, "Zeitschrift für anorganische Chemie," volume 41, page 244). The bismuth-dithiogycolic acid has hitherto been unknown. According to Rosenheim and Davidsohn (see page 246 of the above mentioned journal) a salt of this acid of the formula $$(OH)Bi=(SCH_2COONa)_2.10H_2O$$

is said to be obtained by evaporating a solution of the monosodium-thioglycolate saturated at boiling temperature with freshly precipitated bismuth hydrate. But when working according to this prescription we have found that a salt of the bismuth-dithioglycolic acid cannot be prepared in the said manner, but that always the sodium salt of the bismuth-trithioglycolic acid is formed.

Now we have found that the bismuth-dithioglycolic acid can be obtained by causing thioglycolic acid to act upon bismuth salts in an acid solution. The acid probably has the following constitution:

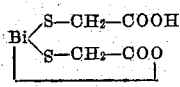

The bismuth-dithioglycolic acid can also be obtained by treating the alkali salts of the bismuth-trithioglycolic acid with acids. Thereby the bismuth-dithioglycolic acid is formed, a thioglycolic acid residue being split off.

The bismuth-dithioglycolic acid and the salts thereof have a small toxicity and a good action on protozoa and they are, therefore, well suitable for treating syphilis and other protozoa diseases.

The bismuth-dithioglycolic acid is not only obtained in the form above indicated, but also in the form of complexes containing thioglycolic acid having the summation formulæ

$$Bi_3S_7C_{14}O_{15}H_{21} \;(a)$$

and $$Bi_2S_5C_{10}O_{11}H_{16} \;(b)$$

which probably have the following constitution:

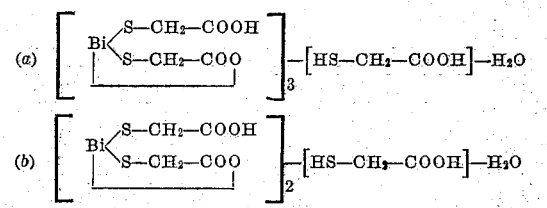

The salts of the new acid are obtained by causing bismuth-dithioglycolic acid to react with alkalies. According to the quantity of alkali used, acid salts of the summation formula $$Bi_3S_6C_{12}O_{12}H_{13}Me_1 . x\; H_2O$$

or neutral salts having the formula $$Bi_3S_6C_{12}O_{13}H_{13}Me_3 . x\; H_2O$$

are obtained, which are not identical with the salt described by Rosenheim and Davidsohn in the said literature.

The salts of the bismuth-dithioglycolic acid probably have the following constitution:

acid salt: 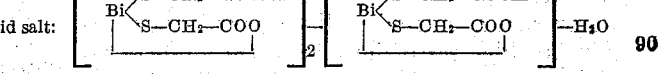

neutral salt: 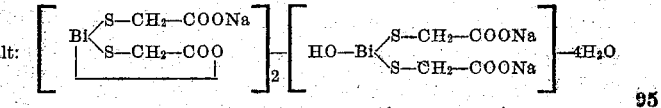

The following examples serve to illustrate the invention, but they are not intended to limit it thereto.

(1) 27.6 grams of thioglycolic acid are diluted with 22 cc. of water and neutralized by means of 15.9 grams of calcinated sodium carbonate. To the solution heated on the vapour bath the bismuth hydroxide, obtained from 53.3 grams of bismuth nitrate, is added and the solution thus obtained is filtered. The filtrate is introduced, while stirring, into 20 parts of methyl alcohol and 30 parts of ether are then added. The yellow sodium salt of bismuthyl-trithioglycolic acid separated hereby is isolated and dried. 22.4 grams of the salt thus obtained are dissolved in 224 cc. of water and by addition of 60 cc. of 2 normal hydrochloric acid the dithioglycolic acid is separated. After filtering by suction, it is washed with water and dried in a vacuum. It is a yellow powder soluble in sodium carbonate.

(2) 20.2 grams of thioglycolic acid are diluted with 202 cc. of water and, while stirring and cooling, a solution of 48.5 grams of bismuth nitrate in 48.5 grams of glycerin and 97 cc. of water is introduced drop by drop. 2 normal caustic soda solution is then added until the mixture has a neutral reaction to Congo paper; after filtering by suction, the substance is made into a paste with methyl alcohol, again filtered by suction and washed with methyl alcohol and ether. The preparation thus obtained is identical with the dithioglycolic acid obtained according to Example 1.

(3) In order to obtain the salt of the bismuth-dithioglycolic acid, 5.2 grams of the dithioglycolic acid obtained according to Examples 1 or 2 are made into a paste with 10 cc. of water and a 2 normal solution of sodium carbonate is added until the whole is just dissolved. About 5 cc. of the sodium carbonate solution are utilized. The filtered solution is introduced, while stirring, into 20 parts of methyl alcohol and 30 parts of ether are added thereto. The yellow preparation which is filtered by suction and washed with ether dissolves in a small quantity of water to a clear solution. The solution has an acid reaction to litmus paper. The preparation contains 51.3% of bismuth, 15.11% of sulfur, 4.03% of sodium (calculated: 50.9% of bismuth, 15.58% of sulfur, 3.73% of sodium).

(4) The neutral salt of the bismuth-dithioglycolic acid is obtained by making a paste of 30 grams of the dithioglycolic acid obtained according to Example 1 or 2 and 50 cc. of water and 2 normal sodium carbonate solution is added until there is an amphoteric reaction. About 57.5 cc. are utilized. The solution obtained is filtered and introduced, while stirring, into 20 parts of methyl alcohol and 30 parts of ether are then added. The yellow salt which is filtered by suction and washed with ether dissolves in water to a clear solution. The solution has an amphoteric reaction. The preparation contains 46.5% of bismuth, 14.61% of sulfur and 6.65% of sodium (calculated: 46.51% of bismuth, 14.24% of sulfur, 6.82% of sodium).

(5) To a solution of 13.8 grams of thioglycolic acid in 75 cc. of a 2 normal solution of sodium carbonate and 63 cc. of water 19 grams of sodium bismuthyl-tartrate (55% of bismuth), dissolved in 114 cc. of water, are introduced drop by drop, while stirring, 2 normal hydrochloric acid is added until there is no longer any precipitation, the separated matter is poured off and rubbed with methyl alcohol. The product which is filtered by suction and washed with methyl alcohol and ether is a yellow powder soluble in alkali-bicarbonate to a clear solution. It has the following formula

and probably the following constitution:

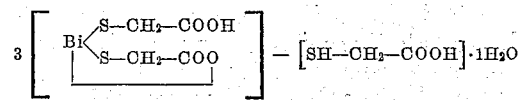

(6) 10.1 grams of thioglycolic acid are dissolved in 55 cc. of a 2 normal solution of sodium carbonate and 46 cc. of water. 19 grams of sodium bismuthyl-tartrate (55% of bismuth), dissolved in 114 cc. of water, are introduced drop by drop, while stirring, and 2 normal hydrochloric acid is then added until there is no longer any precipitation. The separation is filtered by suction, washed with water and dried in a vacuum. The preparation thus obtained is a yellow powder soluble in sodium bicarbonate to a clear solution. It has the following formula

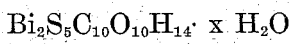

and the following probable constitution:

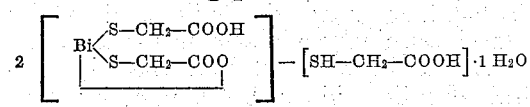

We claim:
1. The process which consists in treating thioglycolic acid in an acid solution with bismuth salts and adding caustic soda solution until the reaction mixture shows a neutral reaction to Congo-paper.

2. The process which consists in treating thioglycolic acid in an acid solution with bismuth nitrate and adding caustic soda solution until the reaction mixture shows a neutral reaction to Congo-paper.

3. The process which consists in adding to thioglycolic acid diluted by addition of water bismuth nitrate and adding caustic soda solution until the reaction mixture has a neutral reaction to Congo paper.

4. The process which consists in adding to one part of thioglycolic acid diluted by addition of ten parts of water a solution of bismuth nitrate in the same quantity of glycerin and double the quantity of water and adding a solution of caustic soda until the reaction mixture has a neutral reaction to Congo paper.

5. The process which consists in adding to one part of thioglycolic acid diluted by addition of ten parts of water a solution of bismuth nitrate in the same quantity of glycerin and double the quantity of water, adding caustic soda solution until the reaction mixture has a neutral reaction to Congo paper and separating the bismuth-dithioglycolic acid thus precipitated.

6. The process which consists in treating thioglycolic acid in an acid solution with bismuth nitrate, adding caustic soda solution until the reaction mixture shows a neutral reaction to Congo paper, separating the precipitate and treating it with caustic soda solution.

7. The process which consists in treating thioglycolic acid in an acid solution with bismuth nitrate, adding caustic soda solution until the reaction mixture shows a neutral reaction to Congo paper, separating the precipitate and treating it after suspending it in a small quantity of water by adding caustic soda solution until the solid parts are dissolved.

8. The process which consists in treating thioglycolic acid in an acid solution with bismuth nitrate, adding caustic soda solution until the reaction mixture shows a neutral reaction to Congo paper, separating the precipitate and treating it after suspending it in a small quantity of water by adding caustic soda solution until the solution has an amphoteric reaction.

9. The process which consists in treating thioglycolic acid in an acid solution with bismuth nitrate, adding caustic soda solution until the reaction mixture shows a neutral reaction to Congo paper, separating the precipitate, treating it after suspending it in a small quantity of water by adding caustic soda solution until the solid parts are dissolved and precipitating the bismuth-dithioglycolic salt thus formed by addition of organic solvents.

10. The process which consists in treating thioglycolic acid in an acid solution with bismuth nitrate, adding caustic soda solution until the reaction mixture shows a neutral reaction to Congo paper, separating the precipitate, treating it after suspending it in a small quantity of water by adding caustic soda solution until the solution has an amphoteric reaction and precipitating the bismuth-dithioglycolic acid thus formed by addition of organic solvents.

11. The process which consists in treating the thioglycolic acid in an acid solution with bismuth nitrate, adding caustic soda solution until the reaction mixture shows a neutral reaction to Congo paper, separating the precipitate, treating it after suspending it in a small quantity of water by adding caustic soda solution until the solid parts are dissolved and precipitating the bismuth-dithioglycolic salt thus formed by addition of methyl alcohol and ether.

12. The process which consists in treating thioglycolic acid in an acid solution with bismuth nitrate, adding caustic soda solution until the reaction mixture shows a neutral reaction to Congo paper, separating the precipitate, treating it after suspending it in a small quantity of water by adding caustic soda solution until the solution has an amphoteric reaction and precipitating the bismuth-dithioglycolic acid thus formed by addition of methyl alcohol and ether.

13. As a new product, the bismuth-dithioglycolic acid of the following formula $$BiS_2C_4O_4H_5$$

and the following probable constitution

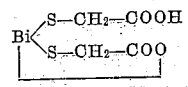

being a yellow powder soluble in sodium carbonate.

14. As new products, complex acids and salts containing a compound of the following formula $$BiS_2C_4O_4H_4X$$

and the following probable constitution

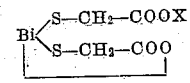

wherein X stands for hydrogen or an alkali metal.

15. As new products, complex acids and salts containing a compound of the following formula $$BiS_2C_4O_4H_4X$$

and the following probable constitution

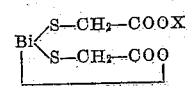

wherein X stands for hydrogen or sodium.

16. As new products, compounds of the following formula $$BiS_{(2x+1)}C_{(4x+2)}O_{(4x+3)}H_{(5x+6)}$$

and the following probable constitution

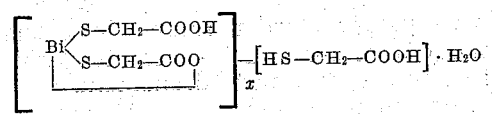

wherein $x$ stands for 2 or 3.

17. As a new product, the compound of the following formula $$Bi_2S_5C_{10}O_{11}H_{16}$$

and the following probable constitution:

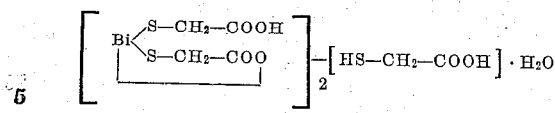

being a yellow powder, soluble in sodium bicarbonate to a clear solution.

18. As a new product, the compound of the following formula $$Bi_3S_7C_{14}O_{15}H_{21}$$

and the following probable constitution

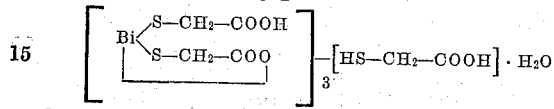

being a yellow powder, soluble in sodium bicarbonate to a clear solution.

19. As new products, compounds of the following probable formula

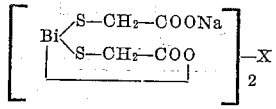

wherein X stands for the complex of the following probable formula

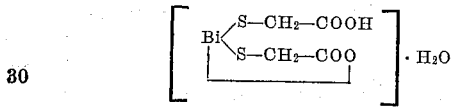

or

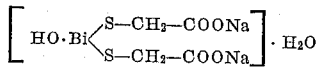

20. As a new product, the compound of the following formula $$Bi_3S_6C_{12}O_{12}H_{13}Na \cdot H_2O$$

and the following probable constitution:

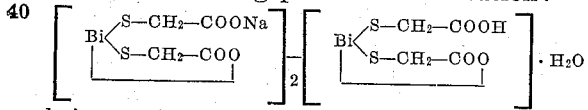

being a yellow powder, soluble in a small quantity of water to a clear solution which has an acid reaction to litmus paper.

21. As a new product, the compound of the following formula $$Bi_3S_6C_{12}O_{13}H_{13}Na \cdot 4H_2O$$

and the following probable constitution

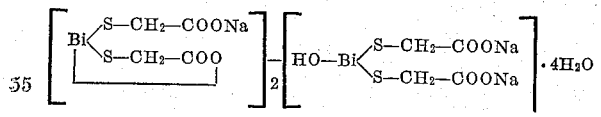

being a yellow powder, soluble in a small quantity of water to a clear solution which has a neutral reaction to litmus paper.

In testimony whereof, we affix our signatures.

KARL STREITWOLF.
ALFRED FEHRLE.
WALTER HERRMANN.
PAUL FRITZSCHE.